April 19, 1949.    R. E. PRENTICE    2,467,776
TRACK STOP FOR CAMERAS AND THE LIKE
Filed Feb. 23, 1946
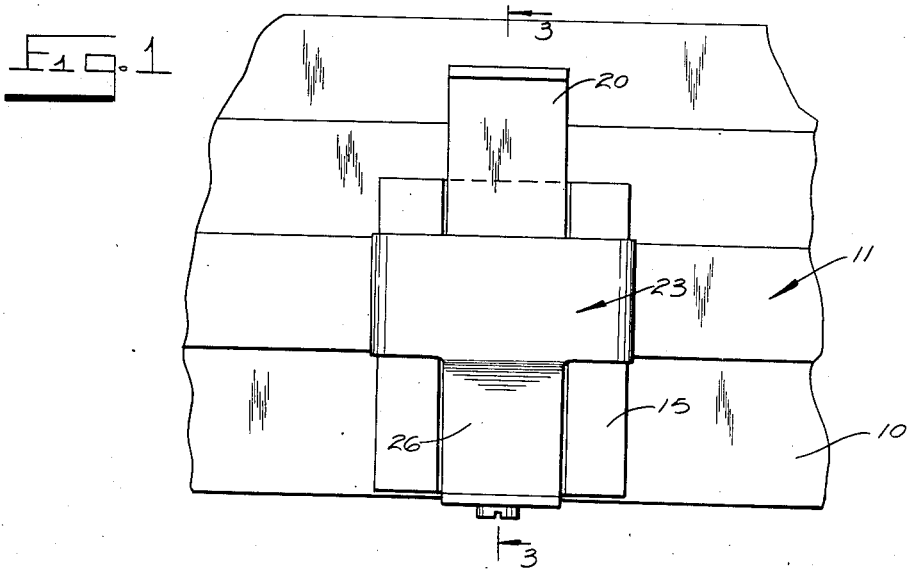
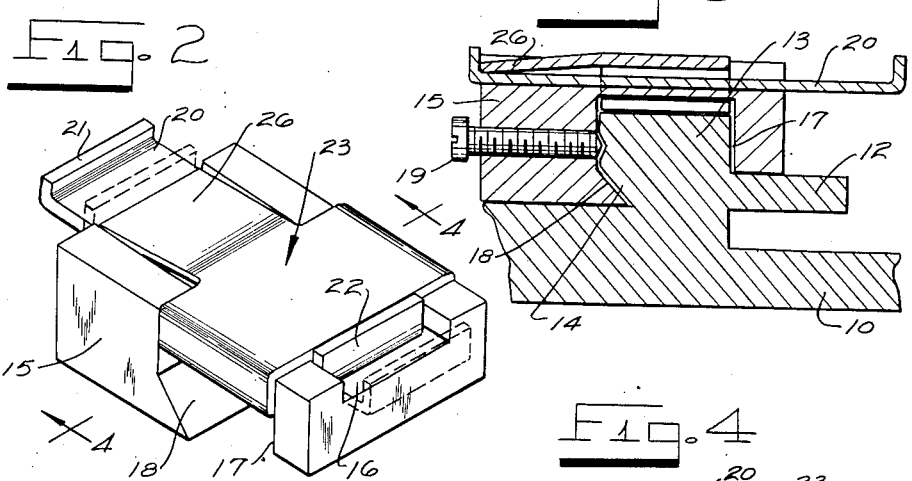
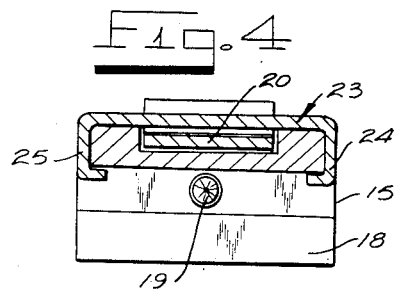
INVENTOR.
RUSSELL E. PRENTICE
BY
ATTORNEYS Patented Apr. 19, 1949

2,467,776

UNITED STATES PATENT OFFICE 2,467,776

TRACK STOP FOR CAMERAS AND THE LIKE

Russell E. Prentice, Dexter, Mich., assignor to General Aniline & Film Corporation, New York, N. Y., a corporation of Delaware Application February 23, 1946, Serial No. 649,666

4 Claims. (Cl. 95—46)

This application pertains to a track stop, such as may be used for locating the lens carriage or lens supporting member of a camera or other photographic equipment. More specifically, it relates to a track stop for a camera, such as a press type camera in which the lens, when the camera front or bed is dropped or opened, is moved outwardly to its infinity position after which it may be racked forwardly for focusing.

Among the objects of the invention is that of providing a positive stop for the lens carriage which may be set in one position in which it stops the lens assembly for taking pictures at some prescribed focal length, but which may be retracted at will to permit the lens carriage to be moved past it for taking pictures at double extension or at some other focal length.

Another object of the invention is that of providing a lens stop which may be permanently located along the carriage track and a plurality of which may be employed at different positions along the track thereby to provide for stopping the carriage at the appropriate places when employing interchangeable lenses of different focal lengths.

Other objects of the invention will be apparent as the description proceeds.

The invention will be described by reference to the details of one specific embodiment thereof and it is to be understood that this description is presented by way of illustration and that the mechanism may take other forms and may be employed with all types of cameras or other photographic equipment to which it may be applicable.

In the figures of drawing:

Fig. 1 is a plan view of the lens carriage stop as applied to the track of a camera bed.

Fig. 2 is an isometric view of one of the stop members.

Fig. 3 is a section taken at line 3—3, Fig. 1.

Fig. 4 is a section taken at line 4—4, Fig. 2.

Cameras of press type and many other cameras have a lens carriage which is movable along a track, the latter generally being a part of the camera casing which may be moved to a position to provide a support for the lens while taking the picture. In some types of cameras, these tracks are mounted on a non-movable portion of the camera body or casing, but at any instance, the function of the apparatus is similar in that the lens connected by a bellows to a film holding or retaining part of the camera is movable along the track, either for focusing, or for focusing in addition to a greater movement incidental to folding the bellows and moving the lens into the camera casing, and from that position to other positions for taking a picture.

Here the track support 10 which may itself be slidable upon part of the camera casing or enclosure has thereon a track generally designated by numeral 11 and which comprises a horizontal part 12 along which the lens carriage slides and a portion 13 which serves as a further guiding means and, in addition, as a part to which the lens stops may be clamped. This part 13 has an inclined channel 14 which serves as a sort of locking surface within which a correspondingly shaped and cooperating part of the stop engages.

The stop itself is comprised of three parts, one of which is formed as a block 15 which has been machined to present at its top surface a groove 16, and perpendicularly thereto and at the lower side, a second groove or slot bounded at one side by an inner face 17 and at the opposite side by the inclined surface 18 and a continuation thereof extending upwardly and parallel to the face 17. The slot formed by the above-mentioned surfaces and a horizontal surface just beneath the slot 16 is such as to permit the block to slide along the track 13. It may then be clamped on that track by a set screw 19 which preferably has a cone-shaped tip engageable with suitable notches at the edge of the track, or it may merely be employed to clamp the member against the track in some predetermined position. If the track is notched, then the parts may be disassembled and relocated at the correct positions for those lenses for which the notches originally applied.

A slide 20 having upturned ends 21 and 22 fits within the slot or groove 16 and is held in position by a spring member 23 which has laterally extending parts 24 and 25 bent downwardly and in under the top horizontal part of the track engaging groove to maintain the parts as an assembled unit. An extension 26 is bent downwardly and bears with a predetermined amount of spring pressure against the top of the slide 20. That maintains the slide in its slot and also in any set position.

The slide 20 may be pushed inwardly to the positions of Figs. 1 and 3 wherein it acts as a stop for the lens carriage as the lens is moved downwardly to its infinity or to some other desired position. If it is desired to move the lens out to a greater extension, for example, for taking a picture at double extension of the bellows, or when employing interchangeable lenses of different focal lengths, the sliding stop 20 may be pushed inwardly as shown by the full line position indicated at Fig. 2 in which event the lens carriage will move past that stop and may be extended to be positioned by a second and similar stop means. The disclosure to this point has been devoted to describing a single stop and its function. It should be understood that these elements are preferably used in pairs. As many pairs of stops may be employed as are desired for the various interchangeable lenses or for different positions at which any single lens may be used. While it is contemplated that there shall be a stop at each of the tracks, in some instances, it may be possible to employ a single stop at one track member only.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A track stop for photographic cameras and the like comprising a track engaging block, means including a set screw for securing said block to a track, a groove in said block extending transversely of the track when the block is in position on a track, a lens support engaging stop member slideable in said groove and means for retaining said member in the groove and for selectively retaining it in its active or its withdrawn positions, said means including a slot closing member clamped about said block and having a stop member retaining extension resiliently bearing against said member.

2. In a camera having a lens support and a track upon which said lens support is slidable to and from an operative, focussed position, an improved track stop for selectively limiting the position to which the lens support may be moved which comprises a block and means for adjustably securing said block to the track, a groove in the block extending transversely of the track when the block is secured thereon, a slide in said groove and of greater length than the groove and means to limit movement of the slide in the groove, said block and slide being so positioned on the track that when in one extreme position, the slide engages and limits movement of the lens support along the track, while in its opposite position it permits the support to pass and thus to be moved to a more extreme position along the track, and means overlying the groove for retaining the slide therein and for maintaining it in a set position.

3. In a camera having a lens support and a track upon which said lens support is slidable to and from an operative, focussed position, an improved track stop selectively limiting the position to which the lens support may be moved which comprises a block and means for adjustably securing said block to the track, a groove in the block extending transversely of the track when the block is secured thereon, a slide in said groove and of greater length than the groove, said slide being angularly bent at its ends to limit its movement in the groove, said block and slide being so positioned on the track that when the slide is moved to one extreme position, it engages and limits movement of the lens support along the track, while in its opposite position it permits the support to pass and thus to be moved to a more extreme position along the track, and means clamped about the block and overlying the groove for retaining the slide therein, said means having a resilient portion pressed against the slide for frictionally maintaining it in a set position.

4. In a camera having a lens support and a track upon which said lens support is slidable to and from an operative, focussed position, an improved track stop for selectively limiting the position to which the lens support may be moved which comprises a block grooved to a shape complementary to that of the track for longitudinal movement relatively to the track and means for securing said block in fixed position along the track, a second groove in the block extendng transversely of the track when the block is secured thereon, a slide in said groove and of greater length than the groove having its ends angularly bent to limit its movement therein, said block and slide being so positioned on the track that when the slide is moved to one of its extreme positions it engages and limits movement of the lens support along the track, while in its opposite position it permits the support to pass and thus to be moved to a more extreme position along the track, and a groove closing means comprising a strip of sheet material clamped about the block and extending over the groove, said member having a resilient extension pressed against the slide for frictionally maintaining it in a set position.

RUSSELL E. PRENTICE.

REFERENCES CITED

The following references are of record in the file of this patent:

UNITED STATES PATENTS

| Number | Name | Date |
| --- | --- | --- |
| 834,884 | Brownell | Nov. 6, 1906 |
| 937,156 | Kroedel | Oct. 19, 1909 |
| 1,394,599 | Woodward | Oct. 25, 1921 |
| 1,992,399 | Smith | Feb. 26, 1935 |